Patented Feb. 10, 1942

2,272,827

UNITED STATES PATENT OFFICE 2,272,827

OPTICAL RESIN COMPRISING A POLYMERIZED UNSATURATED METHYLENE COMPOUND CONTAINING A POLYNUCLEAR AROMATIC COMPOUND

Carl E. Barnes, Worcester, Mass., assignor, by mesne assignments, to E. I. du Pont de Nemours & Company, Wilmington, Del., a corporation of Delaware No Drawing. Application February 2, 1939, Serial No. 254,228

2 Claims. (Cl. 260—83)

This invention relates to synthetic resins and to optical bodies made thereof and more particularly to such products made of substances containing polymerizable unsaturated methylene groups.

Various compounds which contain the group

in which "R" may be hydrogen or alkyl or aryl groups, herein termed polymerizable unsaturated methylene compounds, are capable of polymerization by a rearrangement of the primary valence bonds in such a way as to produce a more saturated structure which consists of a linear chain having that group as a repeating unit. Some of these polymerized substances, such as methyl methacrylate, are particularly useful in the optical field because of their high transparency. But, a substance otherwise desirable may have the wrong index of refraction or dispersion value or undesired physical characteristics for an intended use. It is, however, feasible to modify such properties by the addition of an inert substance and to make a suitable optical body.

The primary objects of this invention are to provide resin having desired properties, and to form an optical body of high transparency having a required refractive index or dispersion and various physical characteristics. Further objects will be apparent in the following disclosure.

In accordance with my invention, I propose to modify the physical and optical characteristics of a base substance comprising a polymerizable unsaturated methylene compound by polymerizing the same in the presence of an inert, non-polymerizable, modifying agent which is soluble both in the monomeric and in the polymeric base substance and does not inhibit polymerization thereof, and which is capable of imparting a desired refractive index to the polymer or of modifying the hardness thereof, or both. It is to be used in proportions in which it remains dissolved in the polymer as well as in such amounts as give the desired characteristics. It must not be detrimentally reactive with the base substance or impart undesired properties thereto which are not readily overcome by the use of other modifying agents therewith. Also, I may use with this modifying agent various other agents which are compatible therewith and which further give desired properties to the polymer.

Examples of base substances which are usefully modified are found in the following groups:

1. Derivatives of acrylic acid and methacrylic acid, such as their esters, amides and halides.
2. Vinyl esters.
3. Polymerizable substituted ethylenes.
4. Mono-vinyl and isopropenyl ketones.
5. Mono-vinyl isopropenyl ethers.
6. Mono-vinyl and isopropenyl aldehydes.

While many other base substances may be used within the scope of my invention, the following are given as examples of those substances in the above groups which are usable with my modifying agents:

1. The monohydric alcohol esters of acrylic acid and methacrylic acid comprising methyl, ethyl, isopropyl and ter-butyl acrylates and methacrylates and other alkyl esters of these acids, as well as the mono esters of the polyhydric alcohols. They also comprise aryl esters, such as phenyl or benzyl acrylate or methacrylate or paracyclohexylphenyl acrylate or methacrylate. Acryl and methacryl amides and chlorides may also be used.
2. The vinyl esters comprise vinyl acetate, propionate, butyrate, etc.
3. The preferred substituted ethylenes are styrene, furyl ethylene, vinyl chloride and nitroethylene.
4. The preferred ketones comprise methyl vinyl ketone and isopropenyl methyl ketone.
5. The ethers comprise methyl vinyl ether, phenyl vinyl ether and similar substances.
6. Examples of the aldehydes are acrolein and alpha methyl acrolein.

As examples of those soluble inert non-polymerizable organic substances which are capable of imparting a different refractive index to a resin made of such base substances and which do not inhibit polymerization thereof, I may employ any of the following group of polynuclear compounds:

| | |
|---|---|
| Naphthalene | 1.582 |
| Acenaphthene | 1.60 |
| Anthracene | 1.657 |
| Phenanthrene | 1.657 |
| Pyrene | |
| Triphenylbenzene | 1.75 |
| Chlorinated naphthalene | |
| 1-chloroanthracene | 1.696 |
| 9-methylanthracene | 1.696 |
| 9-ethyl anthracene | 1.676 |
| Alpha methyl anthracene | 1.68 |
| 1,6-naphthylenediamine | 1.708 |
| 1,8-naphthylenediamine | 1,683 |
| Alpha naphthylamine | 1.670 |
| Ethyl beta naphthylamine | 1.654 |
| Ethyl alpha naphthylamine | 1.648 |
| Dimethyl beta-naphthylamine | 1.644 |
| Diethyl beta-naphthylamine | 1.632 |
| 1,2 dichloronaphthylamine | 1.634 |
| 1,4 dichloronaphthylamine | 1.623 |
| 1,7 dichloronaphthylamine | 1.610 |
| 1,8 dichloronaphthylamine | 1.624 |
| Methyl alpha-naphthyl ether | 1.623 |
| 1,1 diphenyl ethylene | 1.610 |
| Beta chloronaphthalene | 1.608 |
| Beta methylnaphthalene | 1.603 |
| Alpha chloronaphthalene | 1.633 |
| Beta chloronaphthalene | 1.608 |
| 8 methyl quinoline | 1.616 |
| 7 methyl quinoline | 1.615 |

Chlorinated diphenyls.
Hexachlordiphenyl oxide.

The numbers opposite the names of the compounds are the refractive indices. These materials are not polymerizable compounds in themselves and they are substantially inert or at least do not materially affect the polymerized base substance, except as it imparts the required characteristics thereto. Each of the substances is a polynuclear compound and most of them are condensed polynuclear aromatic hydrocarbons or their derivatives. This group comprises substances having either fused or unfused benzene rings, or having double bonds or nitrogen atoms. It is also to be understood that while these agents may soften the polymer base to some extent, they are not intended to be used as such softening agents or plasticizing materials and if the degree of softness is to great for intended uses then a further hardness improving agent must be added. It is desirable to increase the hardness of the body rather than to decrease it. Hence, I may use those agents, such as the last three substances in the above list, which increase the hardness as well as modify the refractive index of the polymer.

As an example of an optical body made in accordance with this invention, I may employ methyl methacrylate as the base substance with 2% by weight of triphenyl benzene as an index modifying substance, which gives a product having a refractive index of 1.495. Also, methyl methacrylate with 10% of Halowax No. 1001 (chlorinated naphthalene) gives an index of 1.50. The other agents act similarly to modify the optical properties.

Since some of the modifying agents may soften the resin somewhat, or the combination may not be hard enough, I may employ with the base substance and modifying agent a further agent adapted to improve the hardness characteristics. As agents which raise the softening point and increase the hardness of the body, I may employ modifying agents which are capable of acting as cross linking polymers. These cross linking agents are those compounds containing two or more polymerizable unsaturated methylene groups per molecule which are compatible and miscible with the base substance and are capable of copolymerizing therewith. Examples of such cross linking agents are the polyhydric alcohol esters of acrylic and methacrylic acids, and the anhydrides, nitriles, and vinyl and allyl esters of these acids. Examples of the polyhydric alcohols are the hypothetical ethylidene glycol, ethylene glycol, glycerol, pentaglycerol, and various other polyhydric alcohols capable of forming esters with these acids and their homologues. Other desirable cross linking agents are divinyl benzene and divinyl ketone and homologues.

I may also use a modifying agent which improves the hardness characteristics of the body due to the presence of polar substituents, such as carboxyl or amino groups. For example, acrylic acid and methacrylic acid are believed to act as if the carboxyl groups in adjacent chains attract each other, thus raising the softening point and increasing the hardness of the copolymer. As an example of such a hard resin, methyl methacrylate is not sufficiently hard for certain optical purposes and I may, therefore, improve its hardness characteristics by copolymerizing it with a suitable amount of any of the agents above listed, such as methacrylic acid or allyl methacrylate or ethylidine glycol dimethacrylate. For example, an optical body may be made of 70% of methyl methacrylate, 10% of chlorinated naphthalene and 20% of methacrylic acid. Likewise, the other hardness improving agents may be used in suitable proportions.

It will be understood that these resins may be suitably shaped to form the desired optical bodies. Those resins capable of being softened under heat and pressure may be molded, while the hard resins, and particularly those containing a high percentage of a cross linking agent, may be polymerized in a mold and thereafter ground and polished by standard abrading operations. The proportions of the various ingredients will of course be so chosen as to give the required characteristics. If but a small amount of a cross linking agent is used, the base substance resin may be made hard enough for optical uses but still be moldable under heat and pressure. Hence, the proportions of the ingredients may be varied widely, depending upon the characteristics desired.

It will now be understood that many other equivalent substances may be used to modify the optical properties or to increase the hardness of the various polymeric base substances, hence the above description is to be considered as illustrating the general principles of the invention as well as specific applications thereof and not as limitations thereon except as defined by the appended claims.

I claim:

1. A transparent, homogeneous optical resin formed of a polymerized substance comprising a polymerizable unsaturated mono - methylene compound polymerized in the presence of triphenyl benzene which is fully dissolved in the polymer.

2. A transparent resin formed of a polymerized substance comprising methyl methacrylate polymerized in the presence of triphenyl benzene which is fully dissolved in the polymer.

CARL E. BARNES.